(12) United States Patent
Sanford et al.

(10) Patent No.: US 6,179,522 B1
(45) Date of Patent: Jan. 30, 2001

(54) MOBILE REFUSE CENTER STRUCTURE FOR CONTAINMENT AND HANDLING OF HAZARDOUS MATERIALS

(75) Inventors: Emmett Gregory Sanford, Baltimore, MD (US); Philip J. Dunne, Houston, TX (US); Robert R. Elder, Annapolis, MD (US)

(73) Assignee: The United States of America as represented by the Secretary of the Navy, Washington, DC (US)

(*) Notice: Under 35 U.S.C. 154(b), the term of this patent shall be extended for 0 days.

(21) Appl. No.: 09/472,744

(22) Filed: Dec. 27, 1999

Related U.S. Application Data

(63) Continuation-in-part of application No. 09/226,267, filed on Jan. 7, 1999.

(51) Int. Cl.[7] ..................................................... B09B 3/00
(52) U.S. Cl. .......................... 405/128; 52/90.1; 52/143; 405/52; 588/249; 588/259; 588/900
(58) Field of Search .................................. 52/90.1–93.2, 52/143; 405/52–55, 128, 129; 588/249, 259, 900; 280/400; 196/24.1, 181, 187

(56) References Cited

U.S. PATENT DOCUMENTS

| | | | |
|---|---|---|---|
| 4,100,860 | * | 7/1978 | Garblin et al. ....................... 588/259 |
| 4,390,040 | * | 6/1983 | Gablin et al. ..................... 588/249 X |
| 5,254,798 | * | 10/1993 | Zoback .............................. 588/249 X |
| 5,300,137 | * | 4/1994 | Weyland et al. ...................... 405/128 |
| 5,356,206 | * | 10/1994 | Van Valkenburgh ................ 405/128 |
| 5,511,908 | | 4/1996 | Van Valkenburgh et al. . |
| 5,735,639 | | 4/1998 | Payne et al. . |

* cited by examiner

Primary Examiner—Richard Chilcot
(74) Attorney, Agent, or Firm—David Kalmbaugh

(57) ABSTRACT

A mobile reuse center structure for containment and handling of hazardous materials comprising a base assembly having a containment pan, right side and left side walls, front and rear walls and a roof assembly. The right side wall and the front wall each have a door which allow access to the interior of the structure by its user. The left side wall has a plurality of deflagration vents which burst open when pressure is applied to the deflagration vents. The roof assembly has at each corner thereof a corner fitting which may receive a twistlock stacker. The twistlock stackers when coupled to the roof assembly corner fittings allow a drum rack to be stacked on top of and secured to the roof assembly. A machinery compartment is located in the rear end of the mobile reuse center structure. The machinery compartment includes the electrical control and power distribution system for the mobile reuse center structure. The mobile reuse center structure includes the air conditioning and heating unit for distributing heat and air conditioning within the interior portion of the structure. The rear wall of the mobile reuse center structure includes a trio of expanded metal security doors which may be remove from the rear wall allowing the user of mobile reuse center structure to access the machinery compartment.

20 Claims, 16 Drawing Sheets

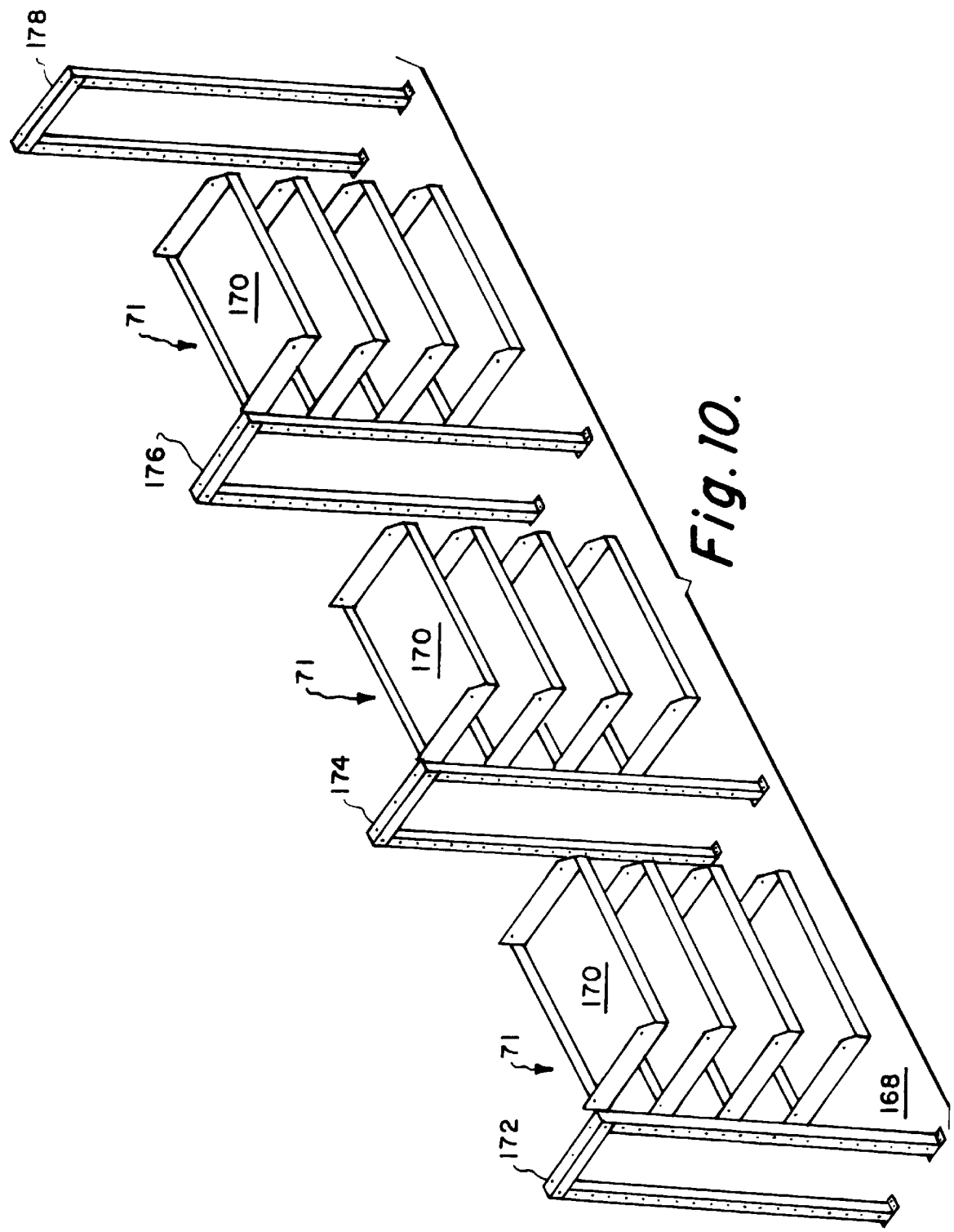

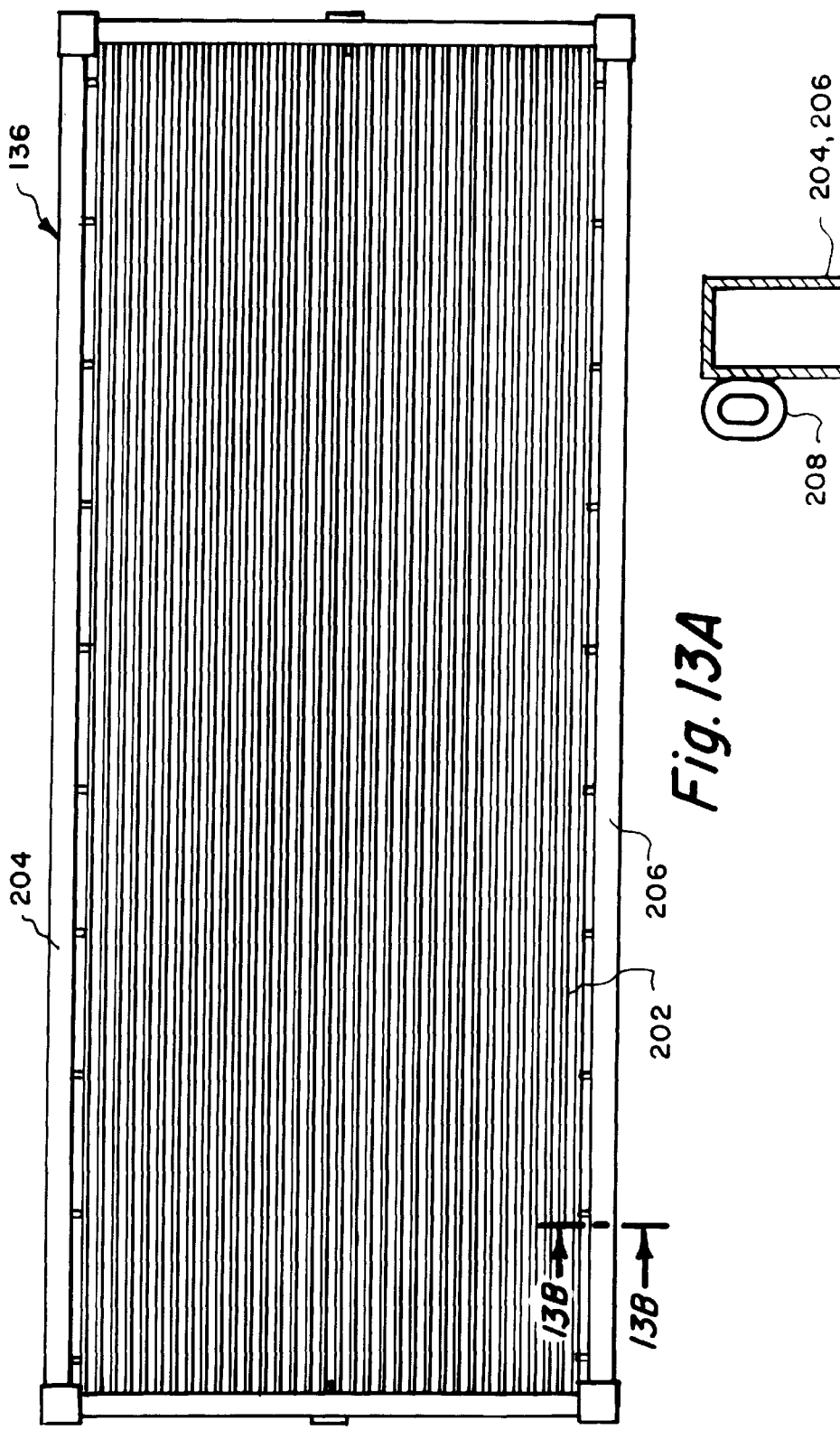
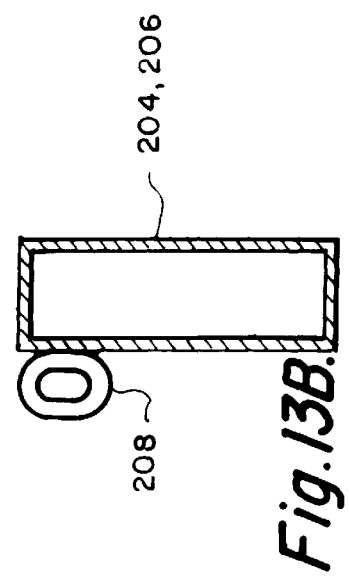
Fig. 13A
Fig. 13B.

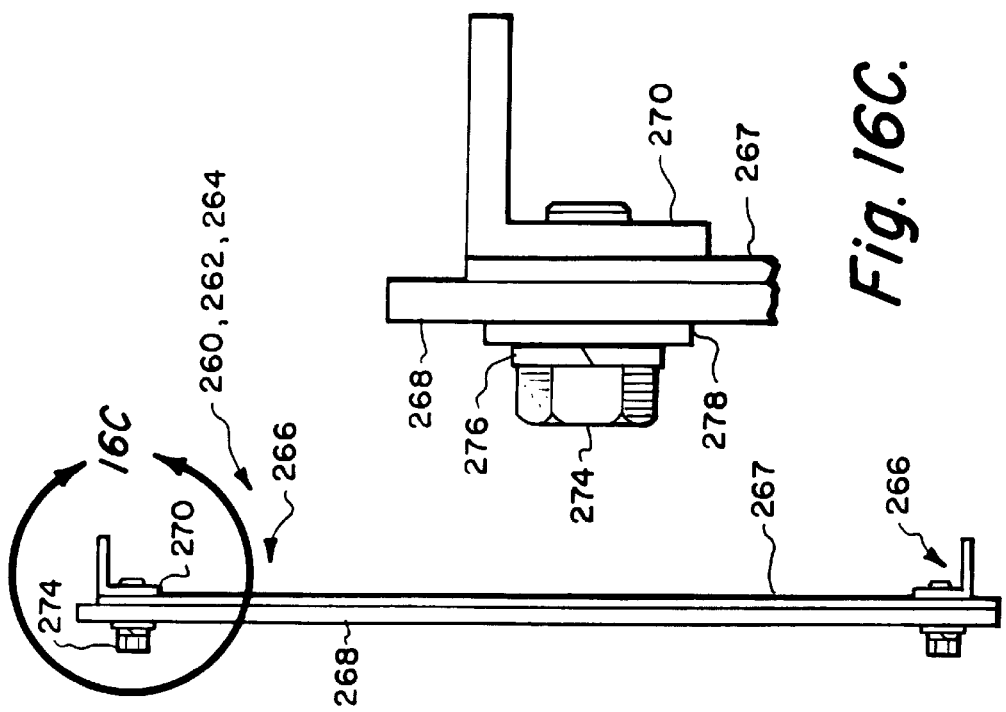
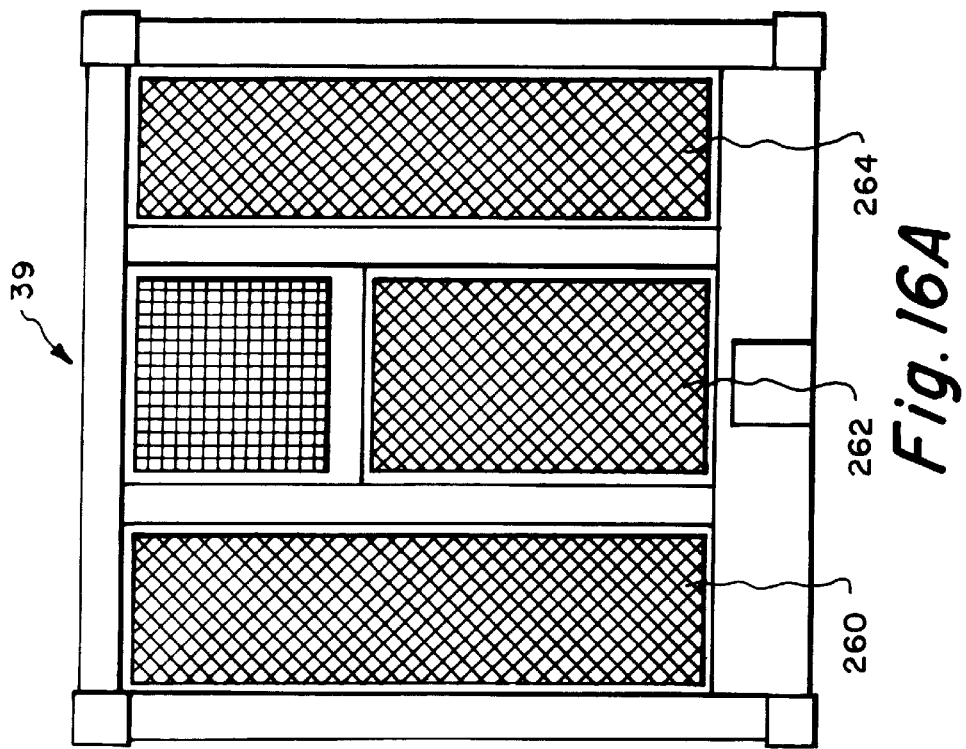

MOBILE REFUSE CENTER STRUCTURE FOR CONTAINMENT AND HANDLING OF HAZARDOUS MATERIALS

This application is a continuation-in-part of U.S. patent application Ser. No. 09/226,267, filed Jan. 7, 1999.

BACKGROUND OF THE INVENTION

1. Field of the Invention

This invention relates generally to the handling of hazardous wastes and other hazardous materials. More specifically, the present invention is concerned with a new form of mobile reuse center structure for the safe handling, distribution, and storing of hazardous materials on land and afloat aboard an ocean going vessel.

2. Description of the Prior Art

The handling and storage of hazardous materials, and particularly hazardous waste has become a problem of major proportions. Increased emphasis is being placed on the importance of assuring that solvents, fuels lubricants, paint related products, and the like are stored with adequate safeguards. Increasingly, it is being recognized that even small spills and relatively minor leakages of the growing number of substances that are toxic and are referred to as "hazardous material" can detrimentally affect persons, property, plants, animals, ground water and other aspects of ecology and the environment. Moreover, in view of the increasing concern about the lasting nature of the adverse effects that can result from spills and unchecked leakage of hazardous materials, the issue of storage and distribution of hazardous materials is receiving increased attention by lawmakers, by regulatory agencies, and by those who have been elected to govern and to enforce the laws and regulations relating to hazardous materials.

There is a genuine and real need for a well designed, heavy duty hazardous material containment facility that appropriately addresses today's increasing concern for the way in which hazardous materials are handled and stored.

There is also a need for a hazardous material containment structure which allows the user to maintain an inventory of the hazardous materials being stored and maintained within the structure.

The above and other needs for a hazardous material containment structure were partially met by U.S. Pat. No. 5,511,908 which issued Apr. 30, 1996 to Norman S. Van Valkenburgh, Gary L. Van Valkenburgh and Edward Payne. U.S. Pat. No. 5,511,908 discloses a single self contained storage unit for the storing and handling of containers of hazardous materials which includes a secondary containment feature in the form of a base assembly having a containment pan. The base assembly of the storage unit also provides a framework for supporting a floor of removable grating which allows access to the containment pan. The storage unit of U.S. Pat. No. 5,511,908 further comprises front, rear and side walls and a roof of very sturdy construction employing interior and outer surface steel panels supported by a generally rectangular shaped tubular steel framework for each wall and the roof of the mobile safety structure. There is sandwiched between the interior and outer surface steel panels of each wall a pair of gypsum boards and R-19 insulation. The insulation allows the user of the storage unit of U.S. Pat. No. 5,511,908 to adapt the structure for use under varying climatic conditions, while the gypsum board provides the structure with at least a four hour fire rating. The framework of the storage unit has corner fittings to receive dual wheel casters and a tow bar which in combination allow a tow truck to move the safety structure from a first location to a second location.

In addition, U.S. Pat. No. 5,735,639, which issued Apr. 7, 1998 to Norman S. Van Valkenburgh, Gary L. Van Valkenburgh and Edward Payne discloses a mobile safety structure in which the self contained storage unit of U.S. Pat. No. 5,511,908 may be configured in tandem or a stacked arrangement comprising four self contained storage units. These arrangements allow for an increase in the handling and storage capacity of hazardous materials and contaminants by the mobile safety structure disclosed in U.S. Pat. No. 5,735,639.

However, under certain conditions, such as the cleanup of a military or civilian ocean going vessel having significant amounts of jet engine fuel, paints, corrosives and other toxic materials thereon, there is requirement for a mobile containment facility to handle and safely store these hazardous materials, preferably a structure having the storage capacity of a warehouse.

In addition, there is a need for a mobile hazardous material containment structure at sites which are remote and generally not accessible such as ocean based drilling platforms.

Further, there is a need to provide for a relatively inexpensive and safe mobile hazardous material containment facility to keep cleanup cost under control while maintaining the safety and health of the personnel using the facility.

In addition, there is a need to provide a hazardous material containment facility for the containment and handling of hazardous materials which is compliant with various local, national and international standards relating thereto, such as the Occupational Safety and Health Administration standards, National Fire Protection Agency standards and the ISO (International organization of Standards) 1496, 9000 and 14000 Series of International Standards and MIL-S-901D, which is grade and shock criteria for water based vessels.

SUMMARY OF THE INVENTION

The mobile reuse center structure of the present invention addresses the foregoing and other needs of hazardous material storage and handling facility by providing an environmentally safe modular storage type facility which will provide a good service life and under circumstances of reasonable use, can be moved inexpensively from site to site over the years as may be appropriate to address a series of different servicing needs for the containment and handling of hazardous materials.

The mobile reuse center structure for containment and handling of hazardous materials comprises a modular hazmat (hazardous material) containment facility which includes a base assembly having a containment pan, right side and left side walls, front and rear walls and a roof assembly. The right side wall and the front wall of the mobile reuse center structure each have a door which allow the user access to the interior of the structure by its user. The left side wall has a plurality of deflagration vents which burst open when pressure is applied to the deflagration vents as the result of an accidental vapor or gas explosion which occurs in the interior portion of mobile reuse center structure.

The base assembly of the mobile reuse center structure has at each corner thereof a corner fitting which may receive wheel casters. The base assembly is also adapted to receive a tow bar which in combination with the wheel casters allows a tow truck to move the unit from a first location to a second location.

The roof assembly of the mobile reuse center structure also has at each corner thereof a corner fitting. The corner fittings at each corner of the base and roof assembly of each modular storage unit may receive twistlock stackers. The twistlock stackers when coupled to the roof assembly corner fittings allow a drum rack to be stacked on top of and secured to the roof assembly. The drum rack includes a containment pan and a removable grating floor.

A machinery compartment is located in the rear end of the mobile reuse center structure. The machinery compartment includes the electrical control and power distribution system for the mobile reuse center structure. Electrical equipment/components which are located in the interior or are mounted on the exterior of mobile reuse center are explosion proof when the components are less than four feet above the floor of the mobile reuse center. A fire suppression controller and fire suppression tank is located within the machinery compartment for use in fighting chemical fires which may occur within unit. The mobile reuse center structure includes the air conditioning and heating unit for distributing heat and air conditioning within the interior portion of the structure. The heating and air conditioning is provided to maintain adequate habitability in extreme exterior ambient temperature and humidity conditions.

The rear wall of the mobile reuse center structure includes a trio of expanded metal security doors which may be remove from the rear wall allowing the user of mobile reuse center structure to access the machinery compartment.

A better understanding of the mobile reuse center structure comprising the present invention as well as a better recognition of its advantages and novel features will be afforded to those skilled in the art from a consideration of the following detailed description of the a preferred embodiment thereof.

BRIEF DESCRIPTION OF THE DRAWINGS

FIG. 6 is a perspective view illustrating an installation arrangement for the mobile reuse center structure of FIG. 1 when placed on board an ocean going vessel or the like;

FIG. 10 is an exploded view illustrating the shelving used in the interior portion of the mobile reuse center structure of FIG. 1;

FIG. 13A is a detailed top view of the removable grating for the drum rack of FIG. 2;

FIG. 13B is a view of one of the tie downs of the drum rack of FIG. 2 taken along line 13B—13B of FIG. 13A;

FIG. 16A is an end view of the machinery compartment enclosure for the mobile reuse center structure of FIG. 1;

FIG. 16B is a view, in section, of one of the expanded metal security doors for the machinery compartment enclosure of the mobile reuse center structure of FIG. 1;

FIG. 16C is a detailed illustration of one of the fastening assemblies of FIG. 16B taken along line 16C—16C of FIG. 16B;

DETAILED DESCRIPTION OF THE PREFERRED EMBODIMENT

Figure 1:
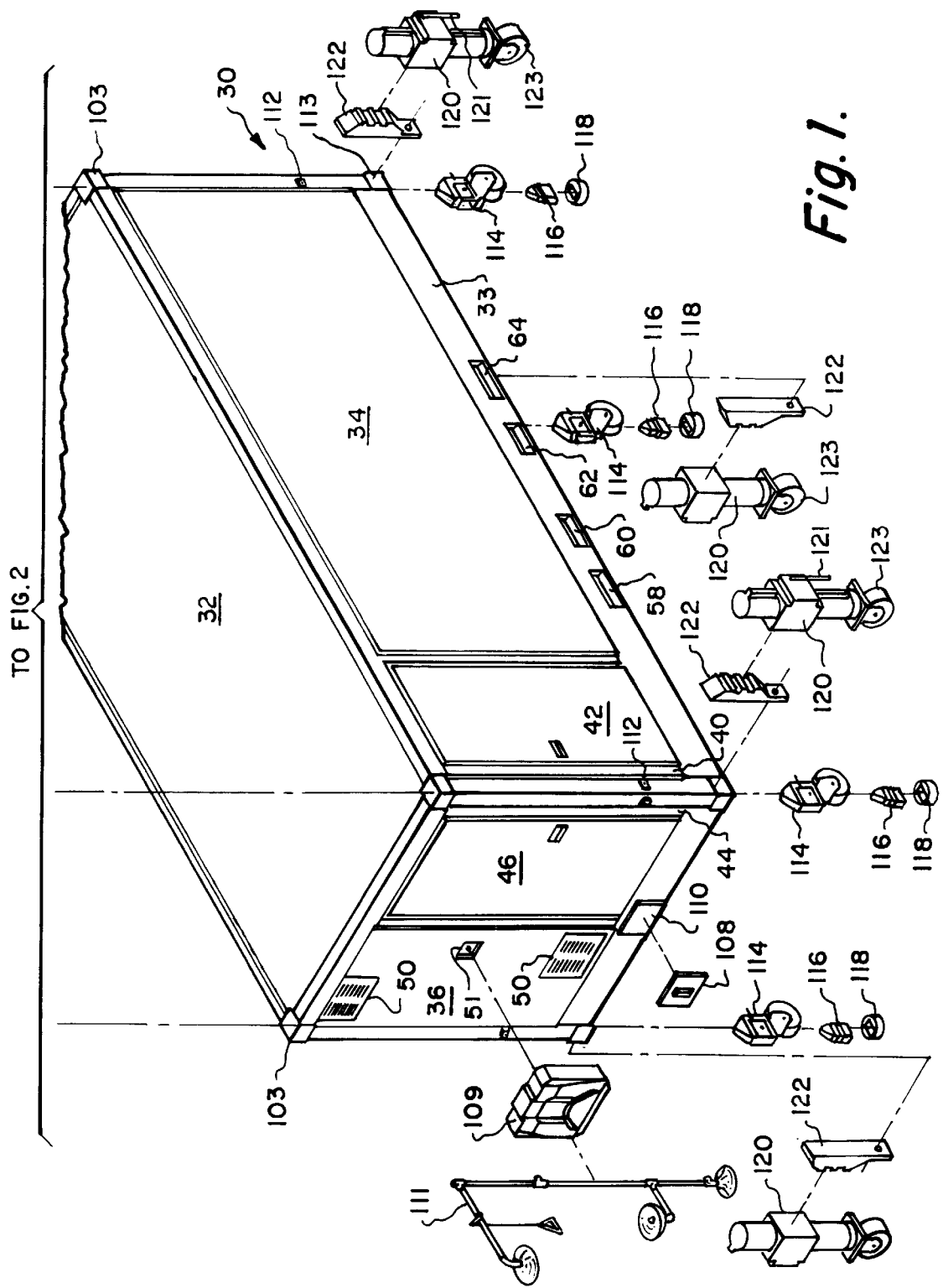
FIG. 1 is a perspective view of the mobile reuse center structure for containment and handling of hazardous materials that constitutes a preferred embodiment of the present invention.
Figure 2:
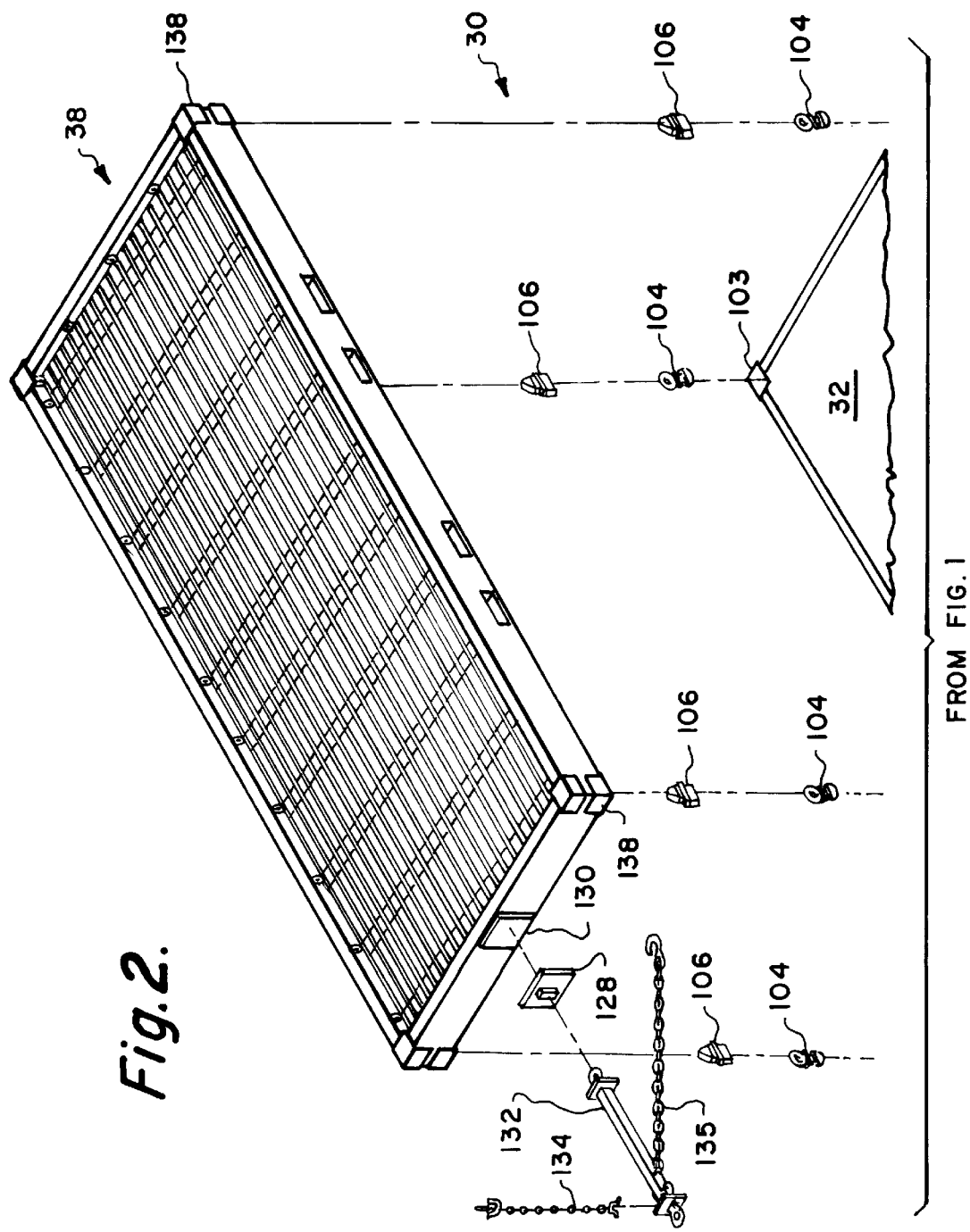
FIG. 2 is a perspective view illustrating a drum rack which is adapted for attachment to the mobile reuse center structure of FIG. 1.
Figure 3:
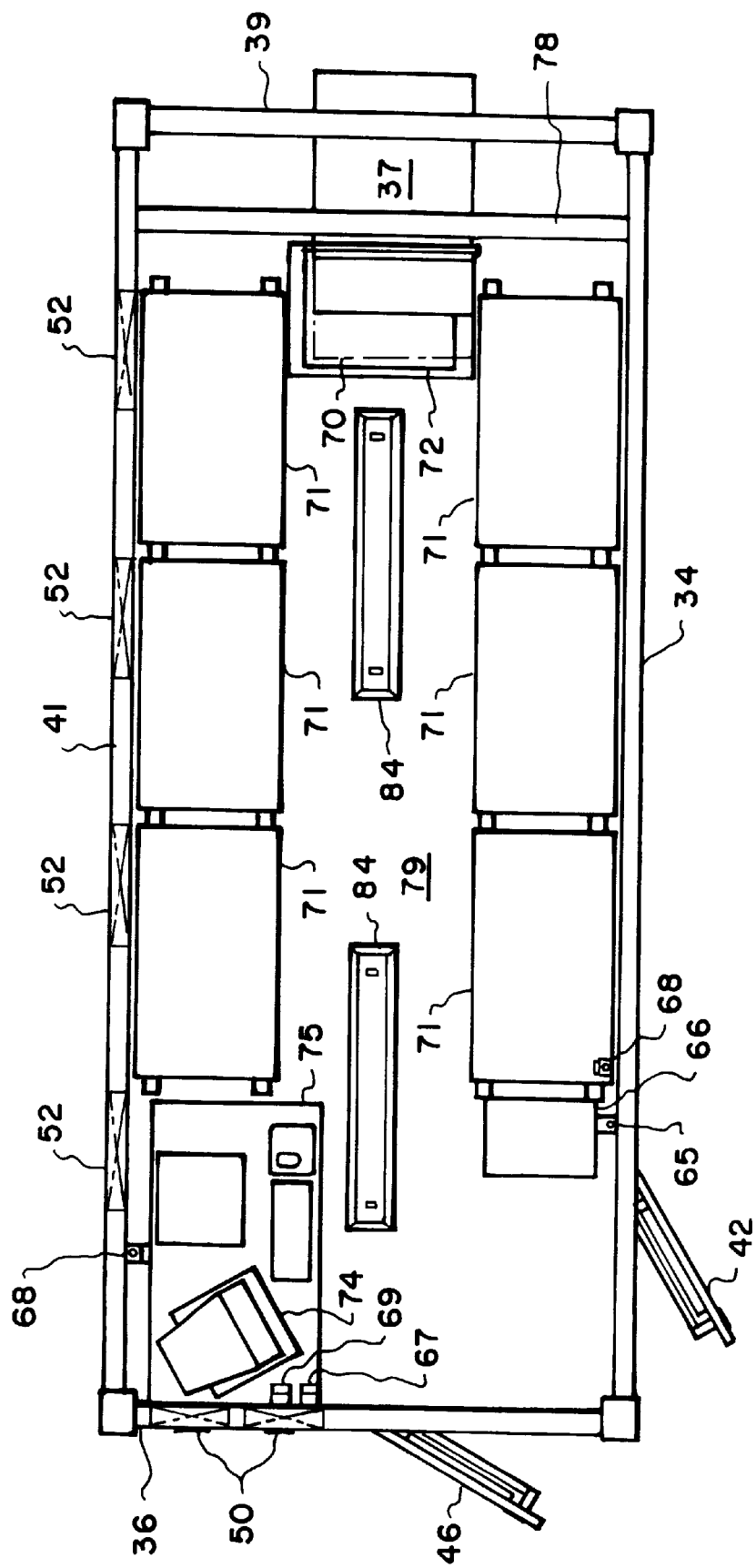
FIG. 3 is an interior view of the mobile reuse center structure of FIG. 1.

Referring now to FIGS. 1, 2 and 3, in overview, there is shown a mobile reuse center structure, designated generally by the reference numeral 30, for the safe handling, distribution, and storing of hazardous materials. Mobile reuse center 30 includes a base assembly 33 (FIG. 1) or skid and an assembly of upstanding walls that is supported on base assembly 33. Unit 30 also includes a roof assembly 32, that is supported atop the rectangularly shaped assembly of upstanding walls.

The assembly of upstanding walls consist of a right side wall 34, a left side wall 41, an interior wall 78 positioned toward the rear end of mobile reuse center 30 and a front wall 36. There is also located at the end of mobile reuse center 30 a rear wall 39.

A first door frame assembly 40 is incorporated into right side wall 34 and pivotally mounts a door 42. A second door frame assembly 44 is incorporated into front wall 36 and pivotally mounts a door 46. Doors 42 and 46 control access to the interior 79 of mobile reuse center 30 from outside of mobile reuse center 30.

Figure 8:
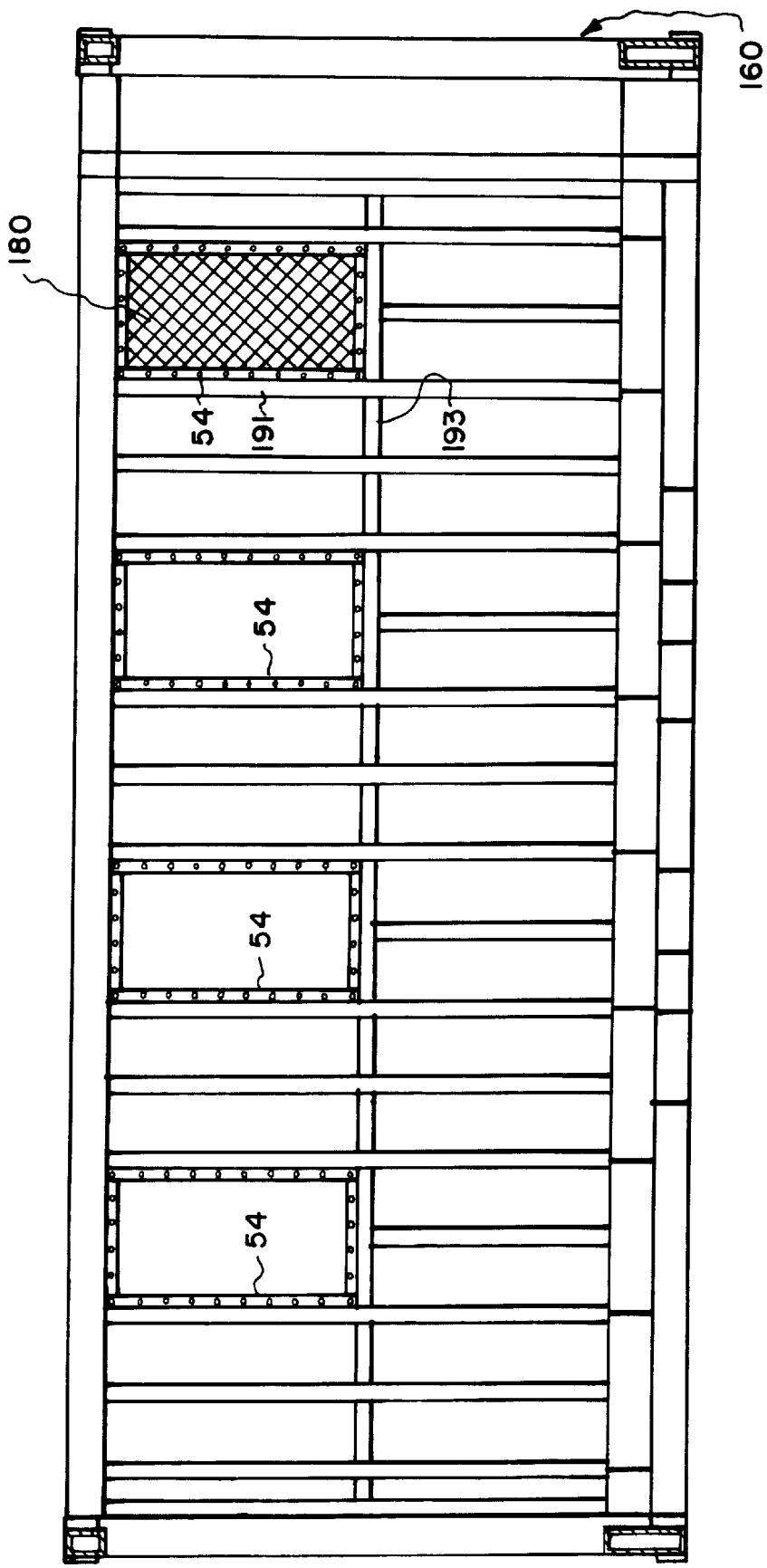
FIG. 8 is an interior view illustrating the framework for the left side wall of the mobile reuse center structure of FIG. 1.

Four deflagration vent support frames 54 (FIG. 8) and their associated deflagration vents 52 are incorporated in left side wall 41. Deflagration vents 52 will burst open when pressure is applied to the deflagration vents 52 as the result of an accidental vapor or gas explosion which occurs in the interior portion 79 of mobile reuse center 30. For example, a hazardous chemical may be stored in the interior 79 of mobile reuse center 30, a gas leak may occur from a rupture in a stored container within interior 79 and an electrical spark could then ignite the gaseous fumes resulting in an explosion in the interior portion of unit 30. The pressure generated from the explosion causes the deflagration vents 52 to burst open releasing combustion waves, toxic gases, etc. into the atmosphere.

There is also a pair of louver plates 50 incorporated in the front wall 36 of mobile reuse center 30. Louver plates 50 allow for the venting of air from interior portion 79 of mobile reuse center 30. Exhaust vans (not illustrated) which are mounted integral with louver plates 50 draw air from interior portion 79 of mobile reuse center 30.

The base assembly 33 of mobile reuse center 30 has a four elongated slots 58, 60, 62 and 64 which run the width of unit 30. The pair of slots 60 and 62 are positioned about the center of base assembly 33 and are positioned to receive the forks of a fork lift truck (not illustrated). Similarly, the pair of slots 58 and 64 are also positioned about the center of base assembly 32 and are positioned to receive the forks of a larger fork lift truck (not illustrated). Placing the pair of slots 60 and 62 as well as the pair of slots 58 and 64 about the center point of mobile reuse center 30 insures that a balance load occurs on the forks of a fork lift truck when the fork lift truck moves mobile reuse center 30 from a first location to a second location.

Figure 12:
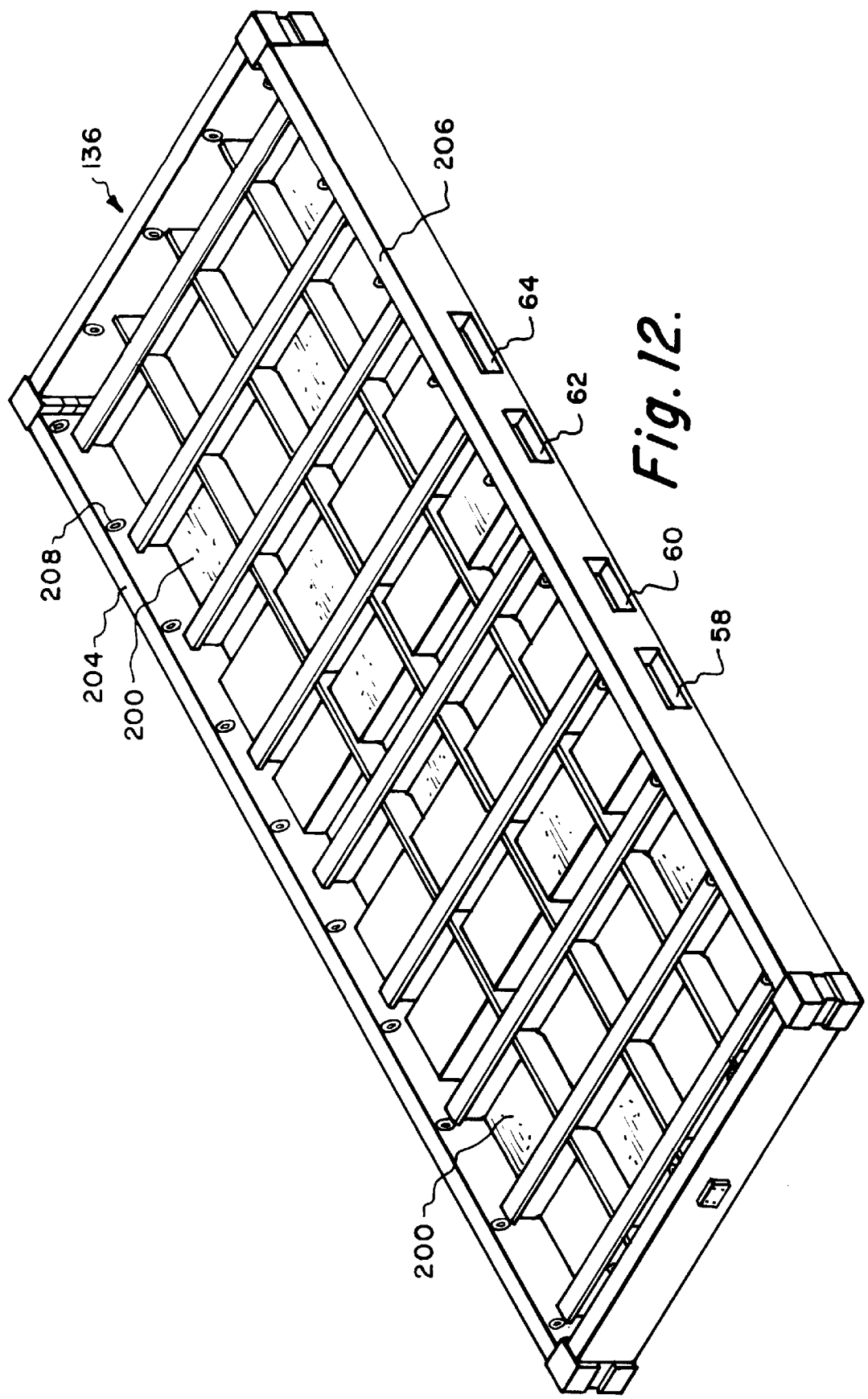
FIG. 12 is a perspective view illustrating the structural details of the drum rack of FIG. 2.

The base assembly 33 for mobile reuse center 30 also has a containment pan and a removable grating floor for capturing hazardous materials which may leak from hazmat materials stored in the interior portion 79 of mobile reuse center 30. The framework for base assembly 33 is almost identical to the framework 136 for drum rack 36 which is illustrated in FIG. 12.

Figure 4:
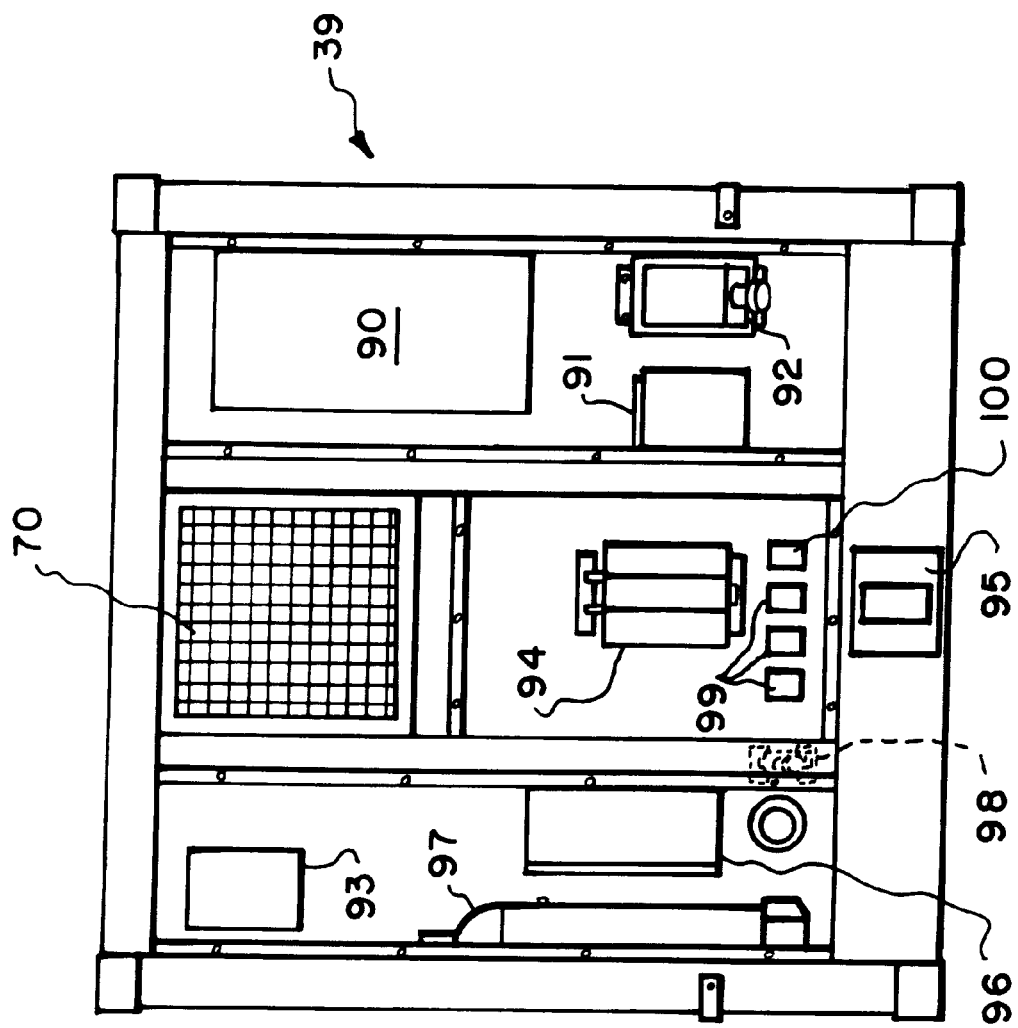
FIG. 4 is an interior view of the machinery compartment of the mobile reuse center structure of FIG. 1 for a land based mobile reuse center structure.
Figure 5:
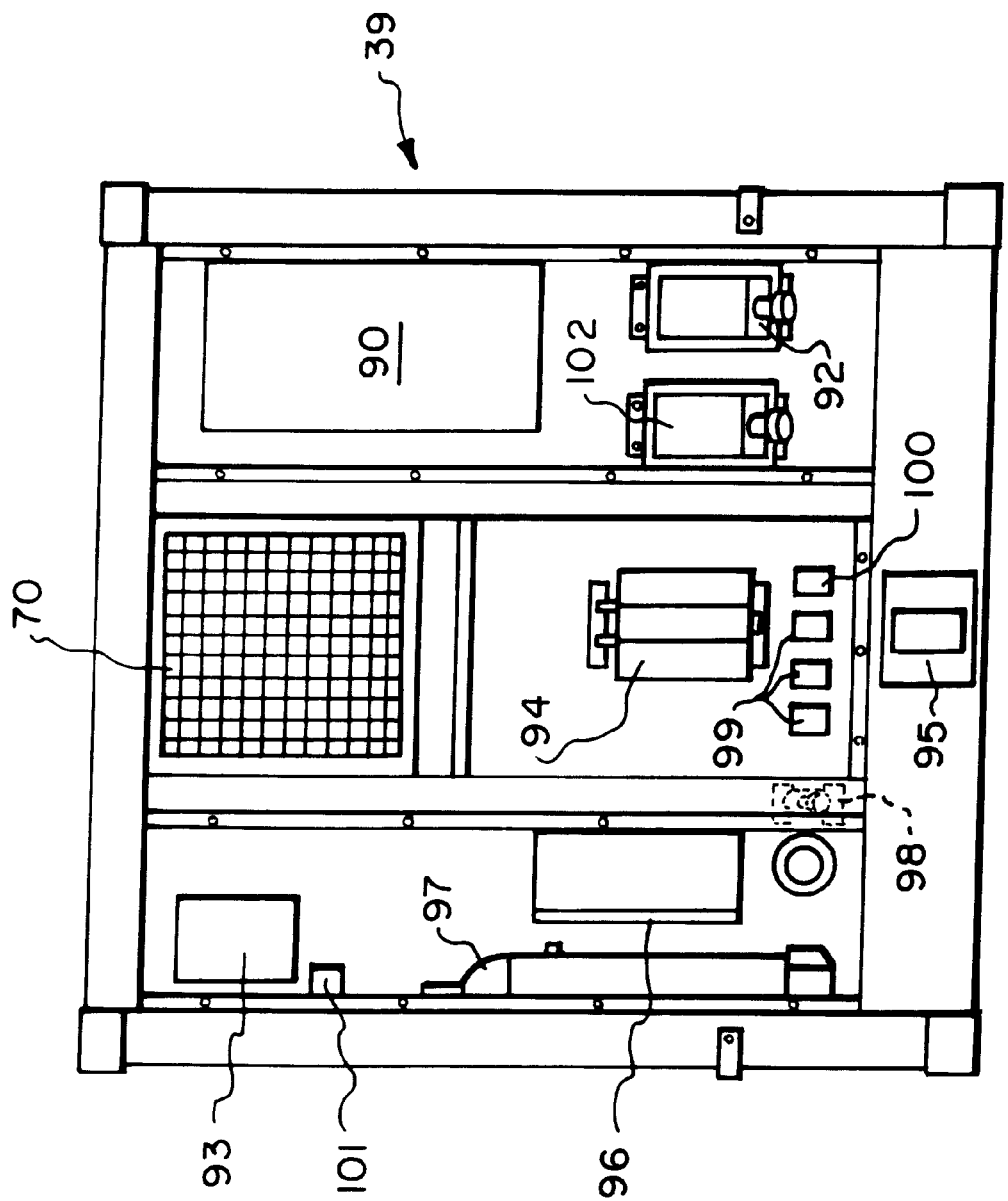
FIG. 5 is an interior view of the machinery compartment of the mobile reuse center structure of FIG. 1 for a sea based mobile reuse center structure.
Figure 6:
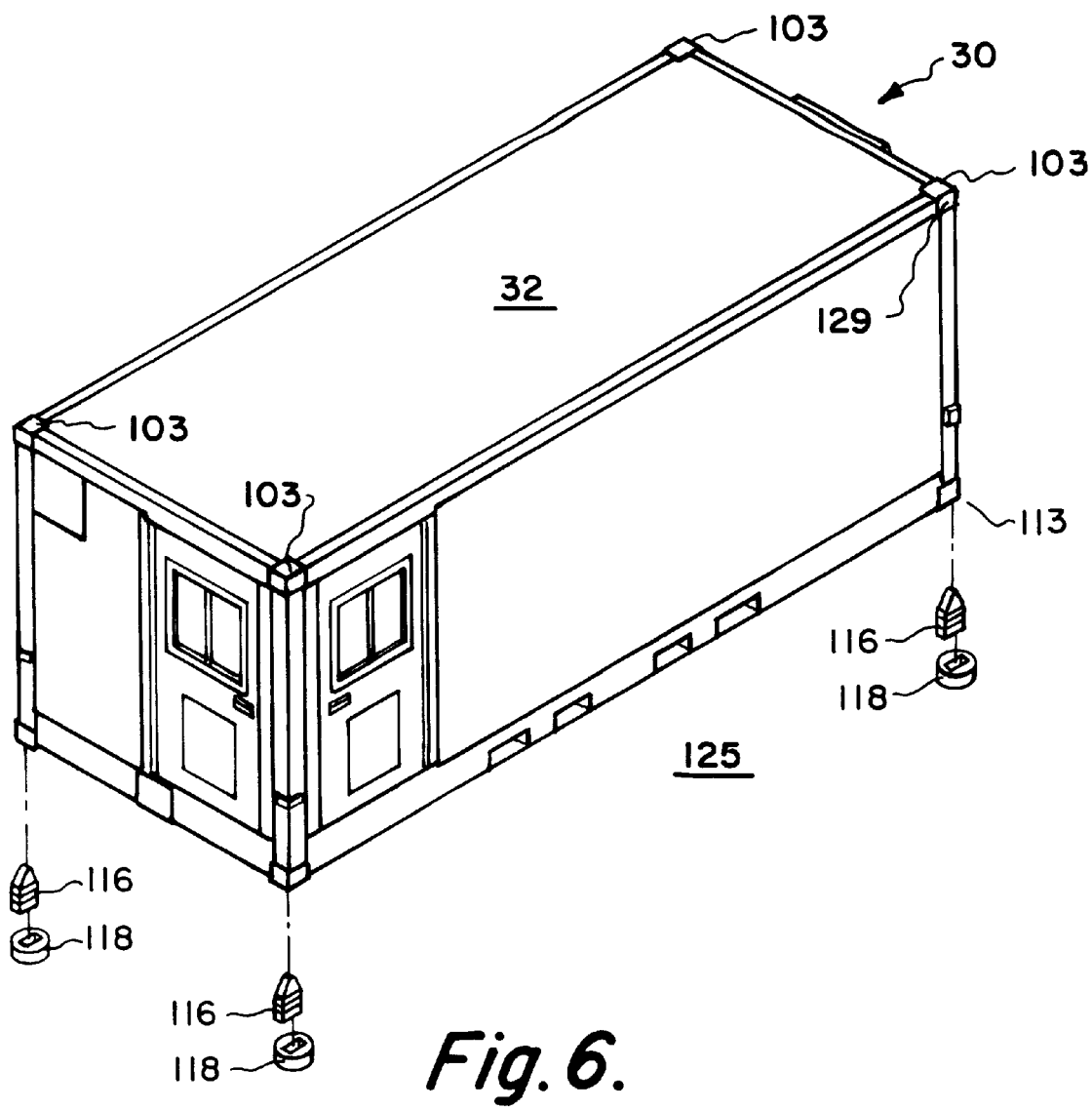

Referring to FIGS. 3, 4 and 5, the rearward portion of mobile reuse center 30 has a machinery room or compartment 37 which is enclosed by interior wall 78, the rear portion of right side wall 34 and left side wall 41 and rear wall 39. Rear wall 39 includes removable expanded metal security doors 260, 262 and 264 (FIG. 16A) which allow the user of mobile reuse center 30 to access machinery compartment 37.

Located in the interior 78 of mobile reuse center 30 is a computer work station which includes a computer and its associated monitor 74 supported on work station desk 75 for the user of the computer work station. Computer and its associated monitor 74 may be any conventional IBM compatible personal computer which is used to keep a detailed record of the hazardous materials and contaminants stored within interior 78 of mobile reuse center 30.

Shelving assemblies 71 are provided for storage of hazmat containers within the interior 79 of mobile reuse center 30. There is also a pair of florescent light fixtures 84 located in the interior portion 79 of mobile reuse center 30 for providing illumination to the interior portion 79 of mobile reuse center 30. Mounted on the interior of right side wall 34 is a light switch 65 for activating florescent light fixtures 84 and a manual pull box (not shown) for fire suppression system activation. A refrigerator 66, which is optional, may be positioned adjacent right side wall 34 toward the front end of the interior portion 79 of mobile reuse center 30

Mounted on front wall 36 are a pair of thermostats 67 and 69 for setting and monitoring the temperature within the interior 79 of mobile reuse center 30. Mounted on left side wall 41 and right side wall 34 of mobile reuse center 30 are a pair of convenience receptacles 68. Receptacles 68 for providing power to electrical apparatus located within the interior 79 of mobile reuse center 30.

Machinery compartment 37 includes an air conditioner 70 for cooling the interior 79 of mobile reuse center 30. The heater 72 for mobile reuse center 30 is located within the interior portion 79 of mobile reuse center 30 adjacent interior wall 78. Machinery compartment 37 also includes a 480/240 240/120 volt transformer 94, a lighting contactor 93, an electrical panel board 90, a 240 volt input receptacle 92, a 120 volt receptacle 98, terminal boxes 91 and 100 and a trio of single gang weatherproof boxes 99 which comprises the electrical control and power distribution system for mobile reuse center 30.

It should be noted that the electrical components illustrated in FIG. 4 are for a land based mobile reuse center. FIG. 5 illustrates another embodiment of the machinery compartment for a mobile reuse center which may be land based or sea based. The machinery compartment 39 depicted in FIG. 5 includes a 220/440 volt input power selector switch 101 and a 440 volt input receptacle 102 which are not found in the machinery compartment of the land based mobile reuse center depicted in FIG. 4.

A fire suppression controller 96 and fire suppression tank 97 are also located within compartment 37 for use in fighting chemical fires which may occur within mobile reuse center 30.

A tow bar hook 95 is removably coupled to the bottom portion of rear wall 39 of mobile reuse center 30.

Referring to FIGS. 1 and 2, base assembly 33 of mobile reuse center 30 includes four ISO corner fittings/wheel support assembles 113 with one corner fitting 113 being positioned at each corner of base assembly 33. Each corner fitting 113 may receive a swivel wheel container caster 114 which, when secured to mobile reuse center 30 allows mobile reuse center 30 to be moved from one location to another location within, for example, a warehouse.

The roof assembly 32 of mobile reuse center 30 also includes four ISO corner fittings 103 with one corner fitting 103 being positioned at each corner of roof assembly 32. Each corner fitting 103 may receive a container lifting lug/eyelet 104 which allows a cable (not illustrated) to be attached thereto. When cables are attached to the lifting lugs 104 at each corner of unit 30, a crane (not illustrated) may be used to remove mobile reuse center 30 from a fixed location and load mobile reuse center 30 on a flatbed trailer for transportation to a new contamination site. A truck having the flatbed trailer attached thereto is used to transport mobile reuse center 30 to the new contamination site where mobile reuse center 30 will be used to clean up the site.

A jack assembly adapter plate 122 may be attached to each corner of mobile reuse center 30 directly into and above each corner fitting 113 of mobile reuse center 30. Each jack assembly adapter plate 122 is adapted to couple a jack assembly 120 to mobile reuse center 30 by means of corner fitting 113 and a jack block 112. Each jack assembly 120 includes a handle 121 which allows the user of mobile reuse center 30 to raise and lower mobile reuse center 30 and a wheel 123 which allows center 30 to be moved from one location to another location.

It should be noted that the base assembly 33 attached to the front end thereof a tow bar plate 110 and pintle hook 108 capable of securing a tow bar (not shown) to mobile reuse center 30 allowing center 30 to be towed by a tow truck from one location to another location.

In addition, it should be noted that a combination drench shower and eyewash station 111 can be mounted on the front wall 36 of mobile reuse center 30 when mobile reuse 30 is used as a land based hazmat facility. The drench shower and eyewash station 111 may be used to remove contaminants and hazardous materials from the body and eyes of individuals working within mobile reuse center 30.

When mobile reuse center 30 is used as a sea based hazmat facility, a portable eyewash device 109 is mounted on the front wall 36 of mobile reuse center 30. The portable eyewash device 109 is used in lieu of drench shower and eyewash station 111 on board an ocean going vessel or the like. A mounting device 51 is included in front wall 36 of mobile reuse center 30 allowing drench shower and eyewash station 111 or portable eyewash device 109 to be mounted on front wall 30.

Each corner fitting 103 of mobile reuse center 30 is adapted to receive a twistlock stacker 106. The four twistlock stackers 106 allow a drum rack 38 to be stored on top of and secured to roof assembly 32 of mobile reuse center 30. Drum rack 38 also has four corner fittings 138 with each of the four corner fittings 138 of drum rack 38 being aligned with one of the four corner fittings 103 of mobile reuse center 30. Each of the four corner fittings 138 of drum rack 38 is adapted to receive one of the four twistlock stackers 106 illustrated in FIG. 2.

It should be noted that drum rack 38 has attached to the front end thereof a tow bar plate 130 and pintle hook 128 capable of securing a tow bar 132 to drum rack 38 which allows mobile reuse center 30 as well as drum rack 38 to be towed by a tow truck from one location to another location. Tow bar 132 is also adapted to receive safety chains 134 and 135 as shown in FIG. 2.

Referring now to FIGS. 1 and 5, there is shown an installation arrangement for mobile reuse center 30 for use on land or on board the hanger deck 125 of an ocean going vessel such as an aircraft carrier. Each corner fitting 113 has one twistlock 116 connected to a raised deck socket 116 of hanger deck 125.

Figure 7:
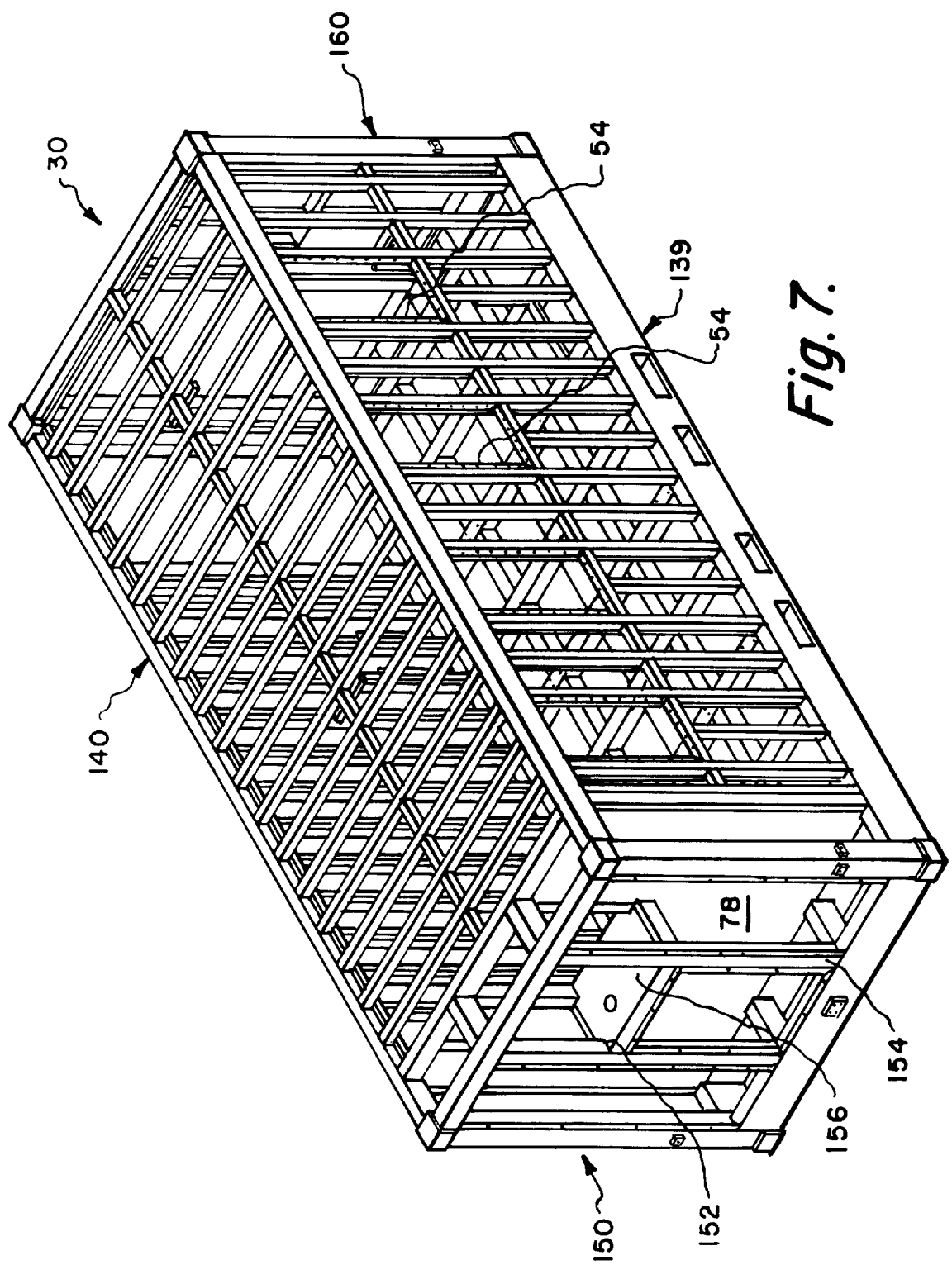
FIG. 7 is an isometric view of the framework for the the mobile reuse center structure of FIG. 1.

Referring to FIGS. 1 and 7, the rectangular shaped framework or support structure (illustrated in FIG. 7) for mobile reuse center 30 is similar to the support structure of the modular mobile safety structure disclosed in U.S. Pat. No. 5,735,639 and the mobile safety structure illustrated in U.S. Pat. No. 5,511,908. For example, the left side wall structure or framework 160 of mobile reuse center 30 is similar to the left side wall structure of the mobile safety structures of U.S. Pat. Nos. 5,511,639 and 5,735,639 except for the addition of deflagration vent support frames 48. In a like manner, the base assembly structure 139 and the roof assembly structure 140 are similar to the base assembly and roof assembly structures of the mobile safety structures of U.S. Pat. Nos. 5,511,639 and 5,735,639.

The framework or support structure 150 for the machinery end of mobile reuse center 30 includes a pair of vertical support members 152 and 154. Vertical support members 152 and 154 and interior wall 78 provide support for an air conditioner support plate 156. Air conditioner support plate 156, in turn, is the mounting plate for air conditioner 70.

Although not illustrated, the outer walls 34, 36 and 41 and the roof 32 of mobile reuse center 30 provide for a strong structural enclosure by using interior and outer surface steel panels supported by the generally rectangular shaped tubular steel framework (illustrated in FIG. 7) for each outer wall 34, 36 and 41 and the roof 32 of the mobile reuse center 30. There is sandwiched between the interior and outer surface steel panels of each wall, the roof and the floor, a pair of gypsum boards and R-19 insulation. The insulation allows the user of mobile modular warehouse structure to adapt the structure for use under varying climatic conditions, while the gypsum board provides the structure with at least a four hour fire rating. Inner wall 78 is fabricated in a like manner to provide for a four hour fire rating.

Referring now to FIGS. 1, 8, 9A and 9B, the framework 160 for left side wall 41 of mobile reuse center 30 has four deflagration vent support frames 54 (FIG. 8), each of which provides support for one of the four deflagration vents 52 and fire dampers 127 of mobile reuse center 30. Each of the four deflagration vents 52 for mobile reuse center 30 comprises a steel mesh 180 which is located on the interior side of the left side wall 41 of mobile reuse center 30. Steel mesh 180, in turn, prevents a user of mobile reuse center 30 from inadvertently disrupting through the deflagration vents 52 on the left side wall 41 of mobile reuse center 30. Sandwiched between steel mesh 180 and the exterior surface 186 of each deflagration vent 52 is an insulation material 184 which is adjacent to surface 186 and fire damper 127. Insulation material 184 is R-19 insulation.

Figure 9A:
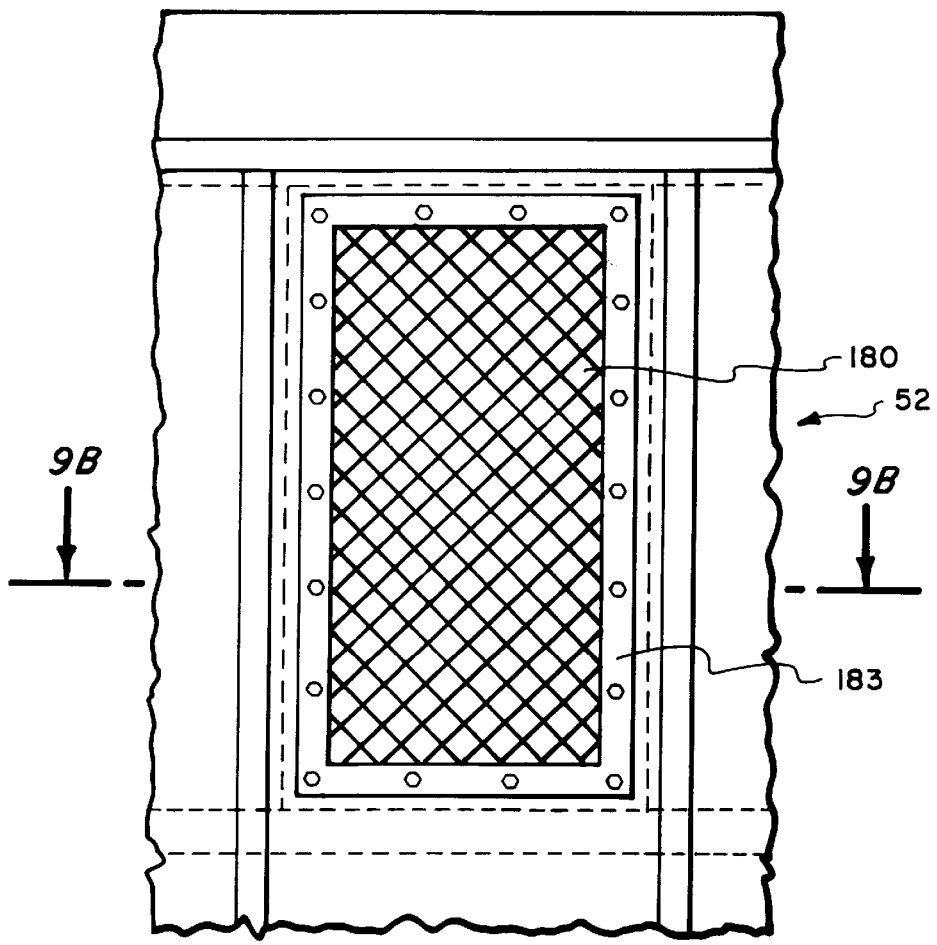
FIG. 9A is an interior view illustrating one of the deflagration vent used in the mobile reuse center structure of FIG. 1.
Figure 9B:
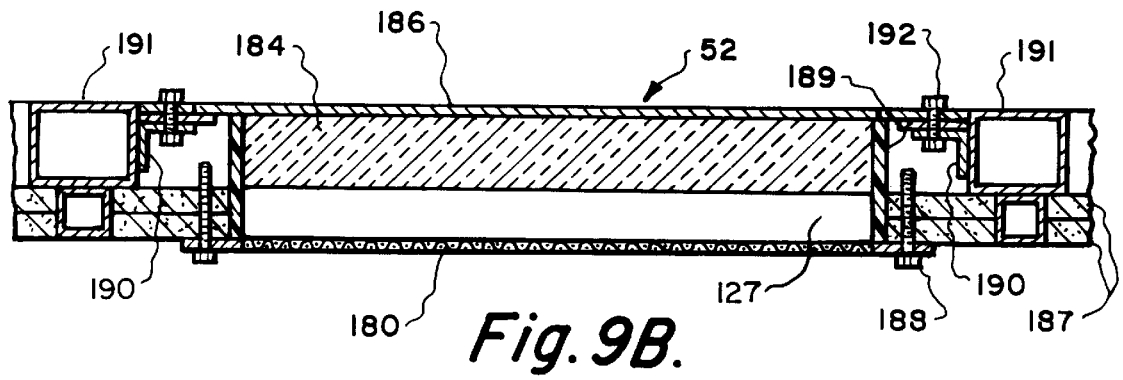
FIG. 9B is a view of the deflagration vent of FIG. 9A, in section, taken along line 9B—9B of FIG. 9A.

As shown in FIG. 9B, the exterior surface 186 of each deflagration vent 52 is secured to vertical support members 191 (as well as horizontal support members 193) of left side wall structure or framework 160 by support brackets 190. Support brackets 190, in turn, are attached to members 191 and 193 by means of welds. Bolts and their associated nuts 192 are used to attach exterior surface 186 of deflagration vents 52 to support brackets 190. The vent opening trim strip 183 and steel mesh 180 are attached to wall boards 187 by means of screws 188. Silicon sealant 189 is located at each edge of deflagration vents 52.

Referring now to FIGS. 3, 10, 11A and 11B, FIG. 10 illustrates an exploded view of the shelving assemblies 71 provided for storage of hazmat containers within the interior 79 of mobile reuse center 30. As shown in FIG. 3 both right side wall 34 and left side wall 41 have three shelving assemblies 71 positioned adjacent thereto.

Figure 11A:
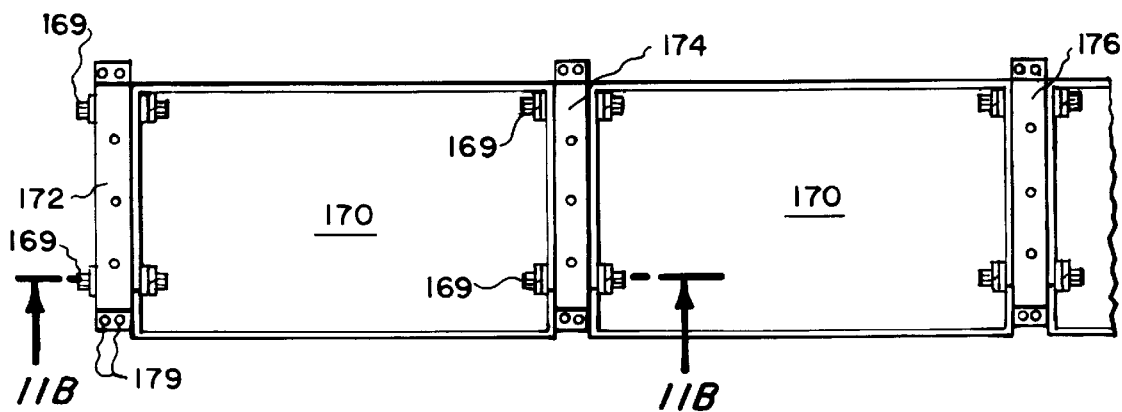
FIG. 11A illustrates the coupling arrangement for the shelving of FIG. 10.
Figure 11B:
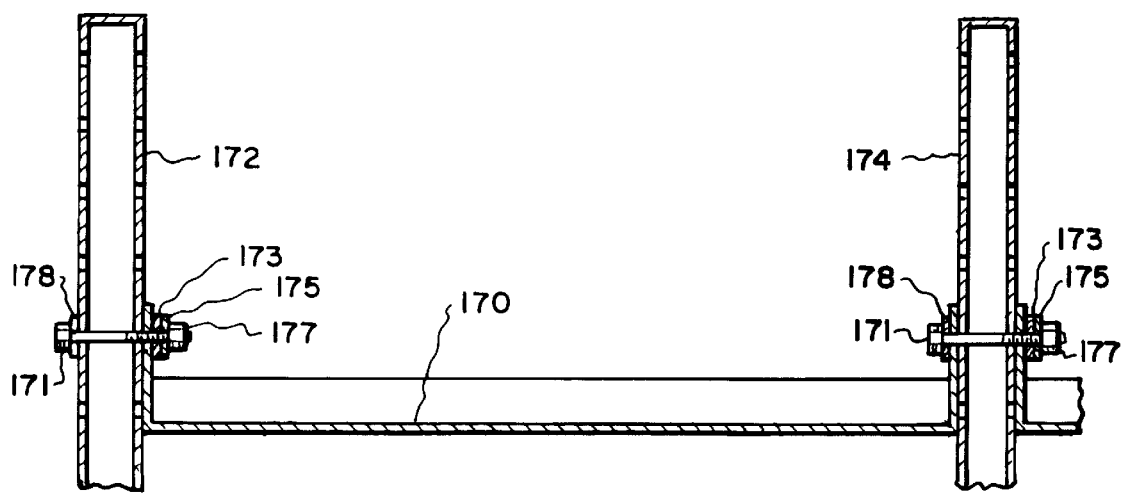
FIG. 11B is a view of the coupling arrangement of FIG. 11A, in section, taken along line 11B—11B of FIG. 11A.

Each of the three shelving assemblies 71 comprises four shelving units or shelves 170 supported by a pair of shelving support members 172 and 174; 174 and 176; or 176 and 178. The shelving support members 172, 174, 176 and 178 are attached to the interior floor 168 and the interior of ceiling of mobile reuse center 30. As depicted in FIGS. 11A and 11B, each shelving unit 170 for each shelving assembly 71 is attached to each of its associate shelving support members by means of four bolt and nut assemblies 169. Each of the four bolt and nut assemblies 169 used to support one shelving unit includes a bolt 171, a pair of flat washers 173 and 178, a lock washer 175 and a nut 177.

As is best illustrated in FIG. 11A, each inner support member 174 and 176 provides support for the shelving units 170 for two of three shelving assemblies 71 depicted in FIG. 10, while the outer support members 172 and 178 provide support for the shelving units 170 for only one of three shelving assemblies 71 depicted in FIG. 10.

Referring now to FIGS. 2, 12 and 13, there is shown in FIG. 12 the generally rectangular shaped support structure or framework 136 for drum rack 36 of FIG. 2. The structure illustrated in FIG. 12 is similar to the structure of the base assembly of the modular mobile safety structure disclosed in U.S. Pat. No. 5,735,639 and the mobile safety structure illustrated in U.S. Pat. No. 5,511,908.

A removable fiberglass or like grating 202 is also included for use with drum rack 38 and rest atop the drum rack containment pan 200. The drum rack containment pan 200 is used to capture hazardous materials which may leak from hazmat containers stored on top of drum rack 38. Hazardous materials captured in containment pan 200 may be removed therefrom by removing grating 202 and then using a pump to withdraw the hazardous materials from the containment pan 200. The removable grating also allows the user of drum rack 38 to visually inspect the interior of the containment pan 200 for hazardous materials which may be contained therein.

Referring to FIGS. 12, 13A and 13B, each elongated tubular support member 204 and 206 of framework 136 for drum rack 36 has attached to its inner surface a plurality of tie downs 208 which are used to secure hazmat container restraining nets (not illustrated) to grating 202 of drum rack 36.

Figure 14A:
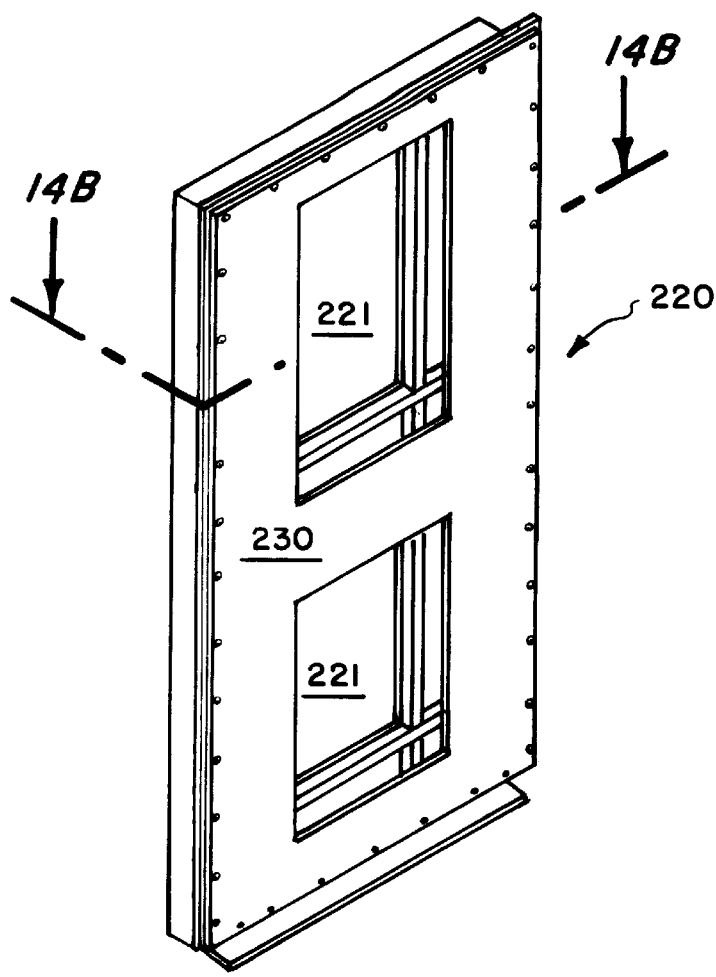
FIG. 14A is a perspective view illustrating a door plug adapted for use with the mobile reuse center structure of FIG. 1.
Figure 14B:
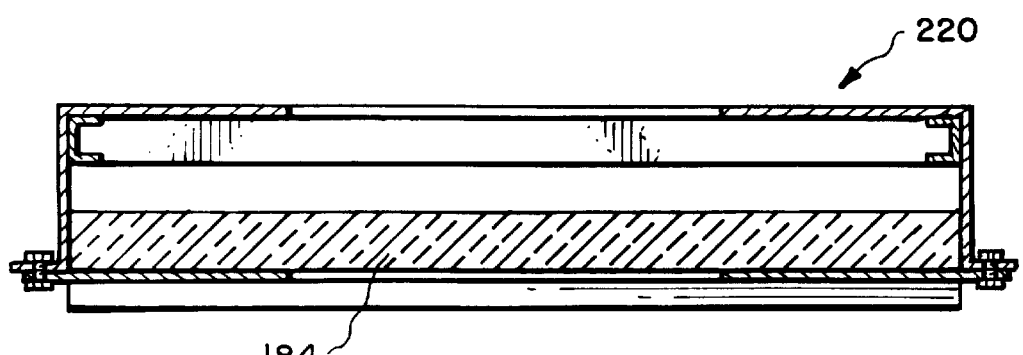
FIG. 14B is a view of the door plug of FIG. 14A taken along line 14B—14B of FIG. 14A.
Figure 15:
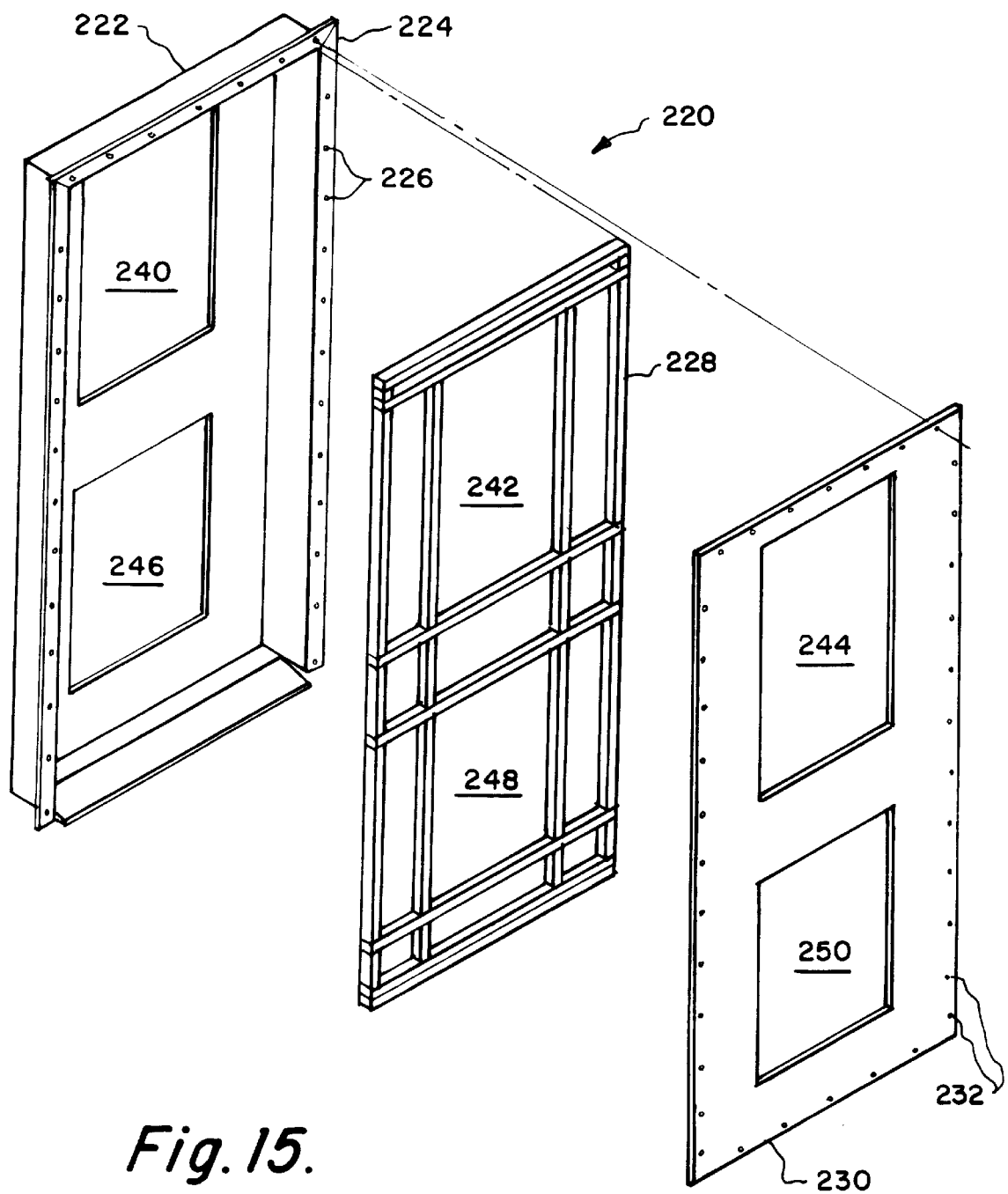
FIG. 15 is an exploded view of the door plug of FIG. 14.

Referring now to FIGS. 14A, 14B and 15, there is shown in FIG. 15 an exploded view of a door conversion assembly 220 which may used to covert a door 42 or 46 (FIG. 1) to allow for its use with a teller window (not illustrated) and a package passer (not illustrated). The teller window is generally located above the package passer. Door conversion assembly 220 includes door plug 222 a structural frame 228, thermal insulation 229 and an outside skin 230. Door plug 222 fits within door frame assembly 40 or door frame assembly 44. Door plug 222 of door frame assembly 220 includes a pair of rectangular shaped openings 240 and 246 which align with openings 242 and 248 in frame 228 and openings 244 and 250 in outside skin 230 to allow for installation of the teller window and package passer. As shown in FIG. 14A, the aligned openings 240, 242 and 244 as well as aligned openings 246, 248 and 250 form the openings 221 illustrated in FIG. 14A. Door plug 222, structural frame 228 and outside skin 230 are welded together to form door conversion assembly 220.

Door plug 222 has a drip edge 224 which includes a plurality of openings 226. Each opening of drip edge 226 aligns with one of the openings 232 of door skin allowing the door conversion assembly 220 to be attached to the inner jambs of door frame assemblies 40 and 44.

As shown in FIG. 14B, door conversion assembly 220 also includes a layer of insulation material 184. Insulation material 184 is R-19 insulation.

Referring to FIGS. 3 and 16, rear wall 39 of mobile reuse center 30 includes a trio of expanded metal security doors 260, 262 and 264 which are removable allowing the user of mobile reuse center 30 to access machinery compartment 37. The mounting structure 266 for each of the trio of expanded metal security doors 260, 262 and 264 is shown in FIGS. 16A and 16B. Located at the edge the expanded metal security screen 267 of each expanded metal security door 260, 262 and 264 is a metallic bar or strip 268 which is used to secure the door to the support structure of rear wall 39. The expanded metal screen 267 is spot welded to metallic bar or strip 268.

As is best illustrated in FIG. 16C, rear wall 39 has a plurality of support members 270 which allow the metallic strip 268 of each screen door 260, 262 and 264 to be connected to the support structure of rear wall 39 by means of a plurality of bolts 274, and their associated lock washers 276 and flat washers 278.

From the foregoing, it may readily be seen that the present invention comprises a new, unique and exceedingly useful mobile reuse center structure for the containment and handling of hazardous materials which constitutes a considerable improvement over the known prior art. Obviously, many modifications and variations of the present invention are possible in light of the above teachings. It is therefore to be understood that within the scope of the appended claims the invention may be practiced otherwise than as specifically described.

What is claimed is:

1. A mobile reuse center structure for storing containers of hazardous materials, said mobile reuse center structure comprising:

(a) a rectangular shaped base assembly having a first group of four corner fittings, one of the first group of four corner fittings of said rectangular shaped base assembly being disposed at each corner of said rectangular shaped base assembly;

(b) first and second side walls extending perpendicularly upward from said base assembly;

(c) a rear wall extending perpendicularly upward from said base assembly and a front wall extending perpendicularly upward from said base assembly, one end of each of said side walls being secured to a separate one of the opposed ends of said front wall and the other end of each of said side walls being secured to a separate one of the opposed ends of said rear wall to form a rectangular shaped assembly of upstanding walls;

(d) an interior wall extending perpendicularly upward from said base assembly, said interior wall being positioned near the rear end of said mobile reuse center structure, said first and second side walls being secured to a separate one of the opposed ends of said interior wall to form an interior portion of said mobile reuse center structure that is defined between said interior wall and said front wall and between said first and second side walls and a machinery compartment that is defined from said interior wall to the rear wall of said mobile reuse center structure;

(e) a rectangular shaped roof assembly mounted atop said rectangular shaped assembly of upstanding walls and extending horizontally over the interior portion and the machinery compartment of said mobile reuse center structure, said rectangular shaped roof assembly having a second group of four corner fittings, one of the second group of four corner fittings of said rectangular shaped roof assembly being disposed at each corner of said rectangular shaped roof assembly;

(f) a rectangular shaped drum rack mounted on top of said rectangular shaped roof assembly of said mobile reuse center structure, said rectangular shaped drum rack being aligned with said roof assembly of said mobile reuse center structure and removable therefrom, said drum rack being adapted for storage of said containers of hazardous materials;

(g) said drum rack having a third group of four corner fittings, one of the third group of four corner fittings of said rectangular shaped drum rack being disposed at each corner of said rectangular shaped drum rack; and (h) four twistlock stackers, each twistlock stacker of said four twistlock stackers coupling one of said second group of four corner fittings of said rectangular shaped roof assembly to an aligned one of said third group of four corner fittings of said rectangular shaped drum rack to secure said rectangular shaped drum rack to said rectangular shaped roof assembly.

2. The mobile reuse center structure of claim 1 wherein said rectangular shaped drum rack includes an secondary containment pan and a removable grating resting upon said secondary containment pan, said removable grating extending substantially horizontally atop said drum rack, said secondary containment pan being adapted to receive and contain said hazardous materials which leak from said containers that are stored on top of said secondary containment pan.

3. The mobile reuse structure of claim 2 wherein said rectangular shaped drum rack has a pair of elongated tubular support member, one of said pair of elongated tubular support members being positioned on one side of said secondary containment pan and the other of said pair of elongated tubular support members being positioned on an opposite side of secondary containment pan, each of said pair of elongated tubular support members having a plurality of tie downs attached thereto.

4. The mobile modular warehouse structure of claim 1 wherein said mobile reuse center includes four swivel wheel container casters, each of said four swivel wheels container casters of said mobile reuse center structure being removably coupled to a separate one of four corner fittings of said base assembly of said mobile reuse center structure, said four swivel wheel container casters of said mobile reuse center structure allowing a movement of said mobile reuse center structure from a first location to a second location.

5. The mobile reuse center structure of claim 1 further comprising a drench shower and eyewash station mounted on the front wall of said mobile reuse center structure, said drench shower and eyewash station being adapted to remove contaminants and hazardous materials from the body and eyes of users of said mobile reuse center structure.

6. The mobile reuse center structure of claim 1 further comprising a portable eyewash device mounted on the front wall of said mobile reuse center structure, said portable eyewash device being adapted to remove contaminants and hazardous materials from the eyes of users of said mobile reuse center structure.

7. The mobile reuse center structure of claim 1 further comprising:
  (a) an air conditioner located within the machinery compartment of said mobile reuse center structure, said air conditioner cooling the interior portion of said mobile reuse center structure; and
  (b) a heater located within the interior portion of said mobile reuse center structure adjacent the interior wall of said mobile reuse center structure, said heater heating the interior portion of said mobile reuse center structure.

8. The mobile reuse center structure of claim 1 wherein said rear wall of said mobile reuse center structure has a trio of expanded metal security doors which are removable from said rear wall to allow for access to said machinery compartment of said mobile reuse center structure.

9. A mobile reuse center structure for storing containers of hazardous materials, said mobile reuse center structure comprising:
  (a) a rectangular shaped base assembly having a first group of four corner fittings, one of the first group of four corner fittings of said rectangular shaped base assembly being disposed at each corner of said rectangular shaped base assembly;
  (b) first and second side walls extending perpendicularly upward from said base assembly;
  (c) a rear wall extending perpendicularly upward from said base assembly and a front wall extending perpendicularly upward from said base assembly, one end of each of said side walls being secured to a separate one of the opposed ends of said front wall and the other end of each of said side walls being secured to a separate one of the opposed ends of said rear wall to form a rectangular shaped assembly of upstanding walls;
  (d) an interior wall extending perpendicularly upward from said base assembly, said interior wall being positioned near the rear end of said mobile reuse center structure, said first and second side walls being secured to a separate one of the opposed ends of said interior wall to form an interior portion of said mobile reuse center structure that is defined between said interior wall and said front wall and between said first and second side walls and a machinery compartment that is defined from said interior wall to the rear wall of said mobile reuse center structure;
  (e) a rectangular shaped roof assembly mounted atop said rectangular shaped assembly of upstanding walls and extending horizontally over the interior portion and the machinery compartment of said mobile reuse center structure, said rectangular shaped roof assembly having a second group of four corner fittings, one of the second group of four corner fittings of said rectangular shaped roof assembly being disposed at each corner of said rectangular shaped roof assembly;
  (f) a rectangular shaped drum rack mounted on top of said rectangular shaped roof assembly of said mobile reuse center structure, said rectangular shaped drum rack being aligned with said roof assembly of said mobile reuse center structure and removable therefrom, said drum rack being adapted for storage of said containers of hazardous materials;
  (g) said drum rack having a third group of four corner fittings, one of the third group of four corner fittings of said rectangular shaped drum rack being disposed at each corner of said rectangular shaped drum rack;
  (h) four twistlock stackers, each twistlock stacker of said four twistlock stackers coupling one of said second group of four corner fittings of said rectangular shaped roof assembly to an aligned one of said third group of four corner fittings of said rectangular shaped drum rack to secure said rectangular shaped drum rack to said rectangular shaped roof assembly;
  (i) the front wall and one of said first and second side walls of said assembly of upstanding walls each having at least one door frame which includes a door to allow access to the interior portion of said mobile reuse center structure; and
  (j) the other one of said first and second side walls of said assembly of upstanding walls having a plurality of deflagration vents, said deflagration vents bursting open when pressure is applied to said deflagration vents resulting from an accidental gas explosion occurring in the interior portion of said mobile reuse center structure.

10. The mobile reuse center structure of claim 9 wherein said rectangular shaped drum rack includes an secondary containment pan and a removable grating resting upon said secondary containment pan, said removable grating extending substantially horizontally atop said drum rack, said secondary containment pan being adapted to receive and contain said hazardous materials which leak from said containers that are stored on top of said secondary containment pan.

11. The mobile reuse structure of claim 10 wherein said rectangular shaped drum rack has a pair of elongated tubular support member, one of said pair of elongated tubular support members being positioned on one side of said secondary containment pan and the other of said pair of elongated tubular support members being positioned on an opposite side of secondary containment pan, each of said pair of elongated tubular support members having a plurality of tie downs attached thereto.

12. The mobile modular warehouse structure of claim 9 wherein said mobile reuse center includes four swivel wheel container casters, each of said four swivel wheel container casters of said mobile reuse center structure being removably coupled to a separate one of four corner fittings of said base assembly of said mobile reuse center structure, said four swivel wheel container casters of said mobile reuse center structure allowing a movement of said mobile reuse center structure from a first location to a second location.

13. The mobile reuse center structure of claim 9 further comprising a drench shower and eyewash station mounted on the front wall of said mobile reuse center structure, said drench shower and eyewash station being adapted to remove contaminants and hazardous materials from the body and eyes of users of said mobile reuse center structure working within said mobile reuse center structure.

14. The mobile reuse center structure of claim 9 further comprising:
   (a) an air conditioner located within the machinery compartment of said mobile reuse center structure, said air conditioner cooling the interior portion of said mobile reuse center structure; and
   (b) a heater located within the interior portion of said mobile reuse center structure adjacent the interior wall of said mobile reuse center structure, said heater heating the interior portion of said mobile reuse center structure.

15. The mobile reuse center structure of claim 9 wherein said rear wall of said mobile reuse center structure has a trio of expanded metal security doors which are removable from said rear wall to allow for access to said machinery compartment of said mobile reuse center structure.

16. The mobile reuse center structure of claim 9 wherein the interior portion of said mobile reuse center structure includes a plurality of shelving units attached to a floor of said mobile reuse center, each of said plurality of shelving units being adapted to store said containers of hazardous materials.

17. A mobile reuse center structure for storing containers of hazardous materials, said mobile reuse center structure comprising:
   (a) a rectangular shaped base assembly having a first group of four corner fittings, one of the first group of four corner fittings of said rectangular shaped base assembly being disposed at each corner of said rectangular shaped base assembly;
   (b) first and second side walls extending perpendicularly upward from said base assembly;
   (c) a rear wall extending perpendicularly upward from said base assembly and a front wall extending perpendicularly upward from said base assembly, one end of each of said side walls being secured to a separate one of the opposed ends of said front wall and the other end of each of said side walls being secured to a separate one of the opposed ends of said rear wall to form a rectangular shaped assembly of upstanding walls;
   (d) an interior wall extending perpendicularly upward from said base assembly, said interior wall being positioned near the rear end of said mobile reuse center structure, said first and second side walls being secured to a separate one of the opposed ends of said interior wall to form an interior portion of said mobile reuse center structure that is defined between said interior wall and said front wall and between said first and second side walls and a machinery compartment that is defined from said interior wall to the rear wall of said mobile reuse center structure;
   (e) the rear wall of said assembly of upstanding walls including first, second and third security doors, said first, second and third security doors being removable from said rear wall allowing a user of said mobile reuse center structure to access the machinery compartment of said mobile reuse center structure;
   (f) a rectangular shaped roof assembly mounted atop said rectangular shaped assembly of upstanding walls and extending horizontally over the interior portion and the machinery compartment of said mobile reuse center structure, said rectangular shaped roof assembly having a second group of four corner fittings, one of the second group of four corner fittings of said rectangular shaped roof assembly being disposed at each corner of said rectangular shaped roof assembly;
   (g) four twistlocks, each twistlock of said four twistlocks coupling one of said first group of four corner fittings of said rectangular shaped base assembly to an aligned one of a plurality of raised deck sockets of a hanger deck securing said mobile reuse center structure to said hanger deck;
   (h) the front wall and one of said first and second side walls of said assembly of upstanding walls each having at least one door frame which includes a door to allow access to the interior portion of said mobile reuse center structure; and
   (i) the other one of said first and second side walls of said assembly of upstanding walls having a plurality of deflagration vents, said deflagration vents bursting open when pressure is applied to said deflagration vents resulting from an accidental gas explosion occurring in the interior portion of said mobile reuse center structure.

18. The mobile reuse center structure of claim 17 further comprising a drench shower and eyewash station mounted on the front wall of said mobile reuse center structure, said drench shower and eyewash station being adapted to remove contaminants and hazardous materials from the body and eyes of users of said mobile reuse center structure working within said mobile reuse center structure.

19. The mobile reuse center structure of claim 17 further comprising:
   (a) an air conditioner located within the machinery compartment of said mobile reuse center structure, said air conditioner cooling the interior portion of said mobile reuse center structure; and
   (b) a heater located within the interior portion of said mobile reuse center structure adjacent the interior wall of said mobile reuse center structure, said heater heating the interior portion of said mobile reuse center structure.

20. The mobile reuse center structure of claim 17 wherein the interior portion of said mobile reuse center structure includes a plurality of shelving units attached to a floor of said mobile reuse center, each of said plurality of shelving units being adapted to store said containers of hazardous materials.

* * * * *